US005975607A

United States Patent [19]

Stewart

[11] Patent Number: 5,975,607

[45] Date of Patent: Nov. 2, 1999

[54] LIMOUSINE FUNERAL COACH

[76] Inventor: Glenn A. Stewart, 2308 Broadway Ave., Alexandria, La. 71301

[21] Appl. No.: 09/268,125

[22] Filed: Mar. 15, 1999

[51] Int. Cl.[6] ........ B60P 3/26

[52] U.S. Cl. ........ 296/17

[58] Field of Search ........ 296/16, 17

[56] References Cited

U.S. PATENT DOCUMENTS

| | | | |
|---|---|---|---|
| D. 183,169 | 7/1958 | Hess et al. | 296/16 |
| 2,666,666 | 1/1954 | Schneider et al. | 296/16 |
| 4,537,438 | 8/1985 | Reasor et al. | 296/17 |

*Primary Examiner*—Gary C. Hoge
*Attorney, Agent, or Firm*—Kenneth D. Baugh

[57] ABSTRACT

A limousine funeral coach 10 is provided with an extended chassis 12. The extended chassis 12 is provided to accommodate a motor compartment 44 and a driver's compartment 50 behind the motor compartment 50. A seat 56 for a driver and a plurality of passengers thereon is provided in the drivers compartment. A passenger compartment 60 is located behind the driver's compartment 50 having a first seat 62 for seating a first plurality of passengers and a second seat 64 for seating a second plurality of passengers thereon. The second seat 64 is aligned and spaced from the first seat 62 so that the passengers in the seat 62 will face the passengers in the seat 64 when seated on the seats. A storage compartment 70 is also provided directly behind the passenger compartment 60. The storage compartment 70 which is provided for carrying flowers in a front portion thereof and a casket containing the remains of the deceased in other portions thereof occupies a space on the chassis substantially equal to the space occupied by both the driver and passenger compartments 50 and 60 respectively. Side access doors 58 and 66 are provided for the driver and passenger compartments 50 and 60, respectively to allow passenger access. Side access doors 78 are provided, allowing for access to the front 80 of the storage compartment 70. A rear access door 86 is provided so that the casket containing the remains of the deceased can be put in and taken out of the funeral coach 10 as desired.

11 Claims, 5 Drawing Sheets

LIMOUSINE FUNERAL COACH

TECHNICAL FIELD

This invention relates to a funeral coach, and more particularly to a limousine funeral coach for transporting people who are participating in a funeral along with the remains of the deceased during the funeral. The practicality of the funeral coach is well known. Although the funeral coach is an accepted means for transporting the deceased during the funeral ritual, there are other concerns. There is the ongoing concern for transporting those persons who participate in the funeral ritual as well. These participants are normally a minister who over sees the funeral as well as pallbearers who carry the casket containing the deceased's remains during the funeral. One method of transporting these participants is with a separate car or limousine. However this method of transporting these funeral participants can result in additional funeral cost because of the requirement of the additional vehicle.

To overcome this concern a more efficient and cost effective method of transporting the remains of the deceased in a casket and the funeral participants is needed. Accordingly a limousine like funeral coach which will transport the remains in the casket as well as provide transportation for other funeral participants in a single vehicle is desirable.

BACKGROUND OF THE ART

Attempts have been made to provide funeral vehicles that provide transportation for the remains of the deceased and passengers. One such vehicle is disclosed in U.S. Pat. No. 4,537,438. This vehicle is provided with a funeral passenger compartment on one side and an axially extending storage compartment on its other side. This vehicle although it transports passengers as well as the deceased is more of a truck or van like vehicle rather than a funeral coach such as those currently used to transport the deceased remains. Accordingly a funeral coach along the lines of the modern day limousine like vehicle which also has the capacity to transport a predetermined number of passengers as well as the deceased remains is needed.

DISCLOSURE OF THE INVENTION

A limousine funeral coach in accordance with the principles of this invention is provided with front and rear members and an extended chassis coupled between the front and rear members. Side members are coupled to each side of the chassis and an upper member is coupled to the side members a predetermined distance above the chassis. A motor compartment is located on a first predetermined portion of the chassis and a driver's compartment is located on a second predetermined portion of the chassis behind the motor compartment. A first means for seating a driver and a plurality of passengers thereon is transversely mounted on the chassis in the drivers compartment. A passenger compartment is located on a third predetermined portion of the chassis separate from and behind the driver's compartment. A second means for seating a second plurality of passengers thereon is mounted on the chassis in the passenger compartment. A third means transversely mounted on the chassis in the passenger compartment is provided to seat a third plurality of passengers and is aligned and spaced from the second means so that the second plurality of passengers will face the first plurality of passengers when seated on the second and third means. A storage compartment is positioned on the chassis on a fourth predetermined portion of the chassis behind the passenger compartment. The storage compartment which is provided for carrying flowers in a front portion thereof and casket containing the remains of the deceased in other portions thereof occupies a space on the chassis substantially equal to the space occupied by both the driver and passenger compartments together. The funeral coach is also provided with a first access means for providing access to the driver's compartment from each side of the chassis. A second access means is provided for allowing access to the passenger compartment from each side of the chassis. The funeral coach is also provided with a third access means which permits access to the front of the storage compartment from each side of the chassis. A fourth access means is provided which permits access to the storage compartment from the rear of the coach so that the casket containing the remains of the deceased can be put in and taken out of the coach as desired.

BRIEF DESCRIPTION OF THE INVENTION

The details of the invention will be described in connection with the accompanying drawing in which.

BEST MODE FOR CARRYING OUT THE INVENTION

Referring to FIGS. 1, 2, 3 and 4 a limousine like funeral coach, generally designated by the numeral, 10 is illustrated. The funeral coach 10 is provided with an elongated body, generally designated, by the numeral, 12. The elongated body 12 is provided with an extended wheel base or chassis 14 including an extended floor 16 associated therewith in a well known manner. The extended chassis 14 can be, for example, an extended limousine chassis which is dimensioned so that the length of the floor of the funeral coach 10 can be at least one hundred sixteen inches longer than the normal funeral coach floor.

Figure 5:
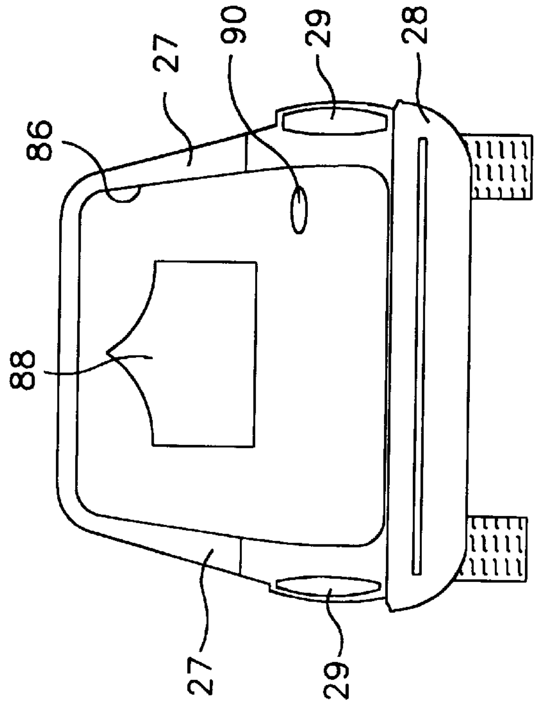
FIG. 5 is a rear elevation view of a funeral coach in accordance with the principles of the invention.
Figure 6:
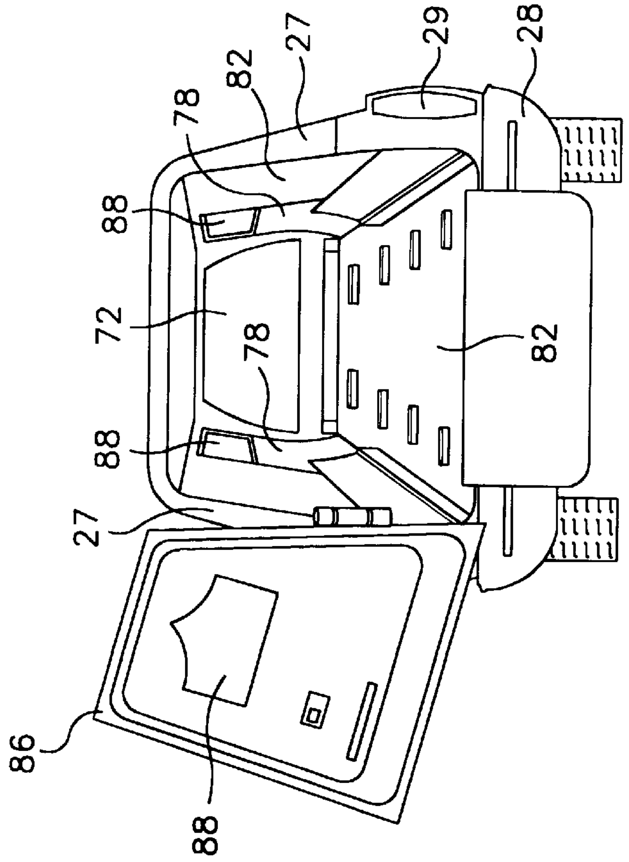
FIG. 6 is a rear elevation view of a funeral coach in accordance with the principles of the invention with the rear door opened.

The elongated body 12 of the funeral coach 10 is also provided with a top or roof, generally designated, by the numeral, 18. The roof 18 is provided with a horizontally extending planar member 20. The planar member 20 is coupled on each side thereof to intermediate side panel 22 and 24, a rear side panel 26 and a rear panel 27 (FIGS. 5 and 6) that are all coupled to the chassis 14 in a well known manner. The rear panel 27 of the coach includes a bumper assembly 28 and a light assembly 29 on each side thereof.

Spaced diagonally descending members 30 extend from front side portions of the planar member 20 into coupling engagement with front side panels 32 of the elongated body 12. The planar member 20 and diagonally descending members 30 form a rectangular like frame 34 for supporting a front windshield 36 in a well known manner. The front side panels 32 are coupled to a front panel 38 which includes a bumper assembly 40 and light assembly 42 on each side thereof The front side panels 32 and the front panel 38 form a motor compartment, generally designated, by the numeral, 44 which includes a hood 46 which provides access to the motor compartment and a motor assembly (not shown) in a well known manner.

Figure 1:
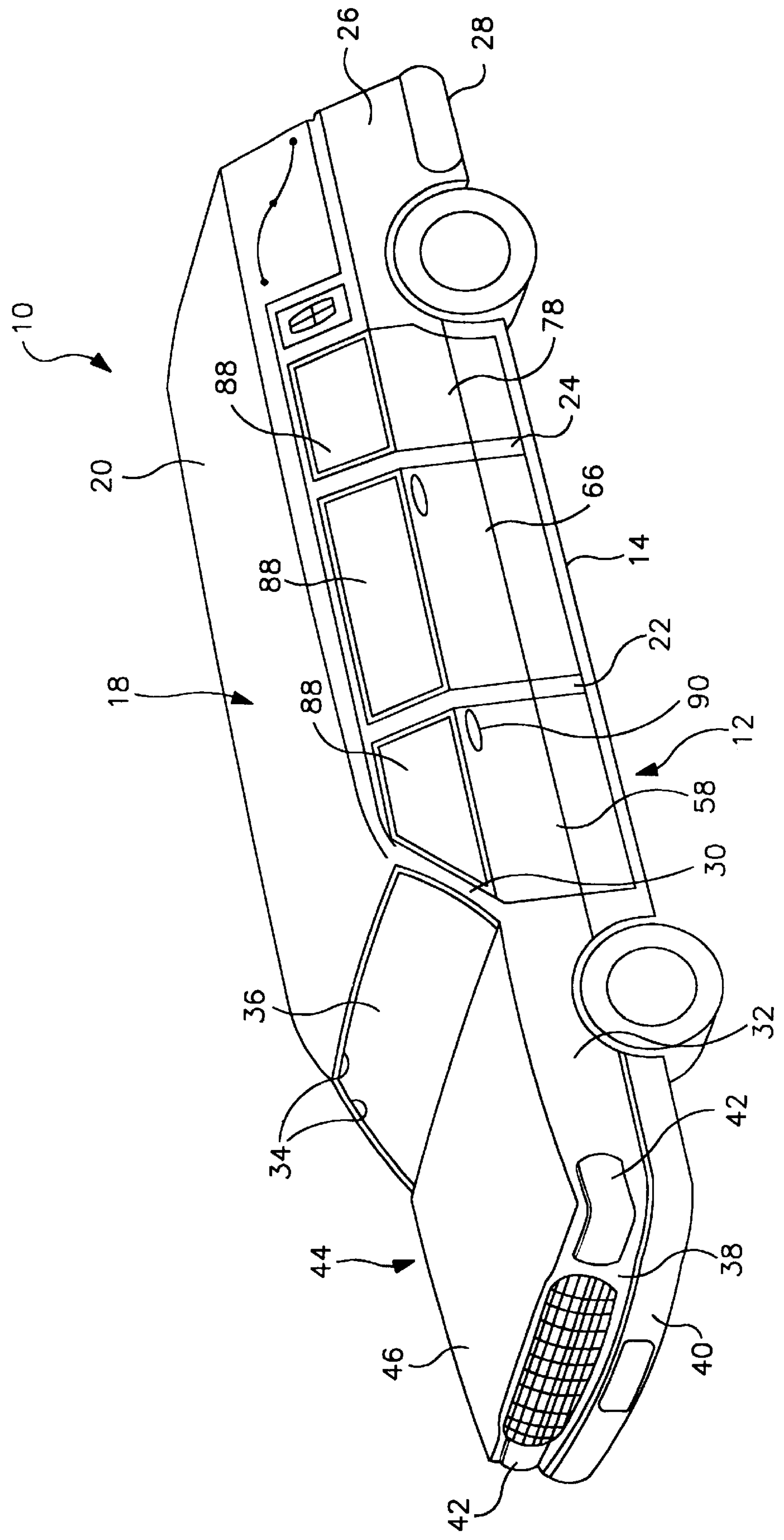
FIG. 1 is a perspective view illustrating a funeral coach in accordance with the principles of the invention.
Figure 2:
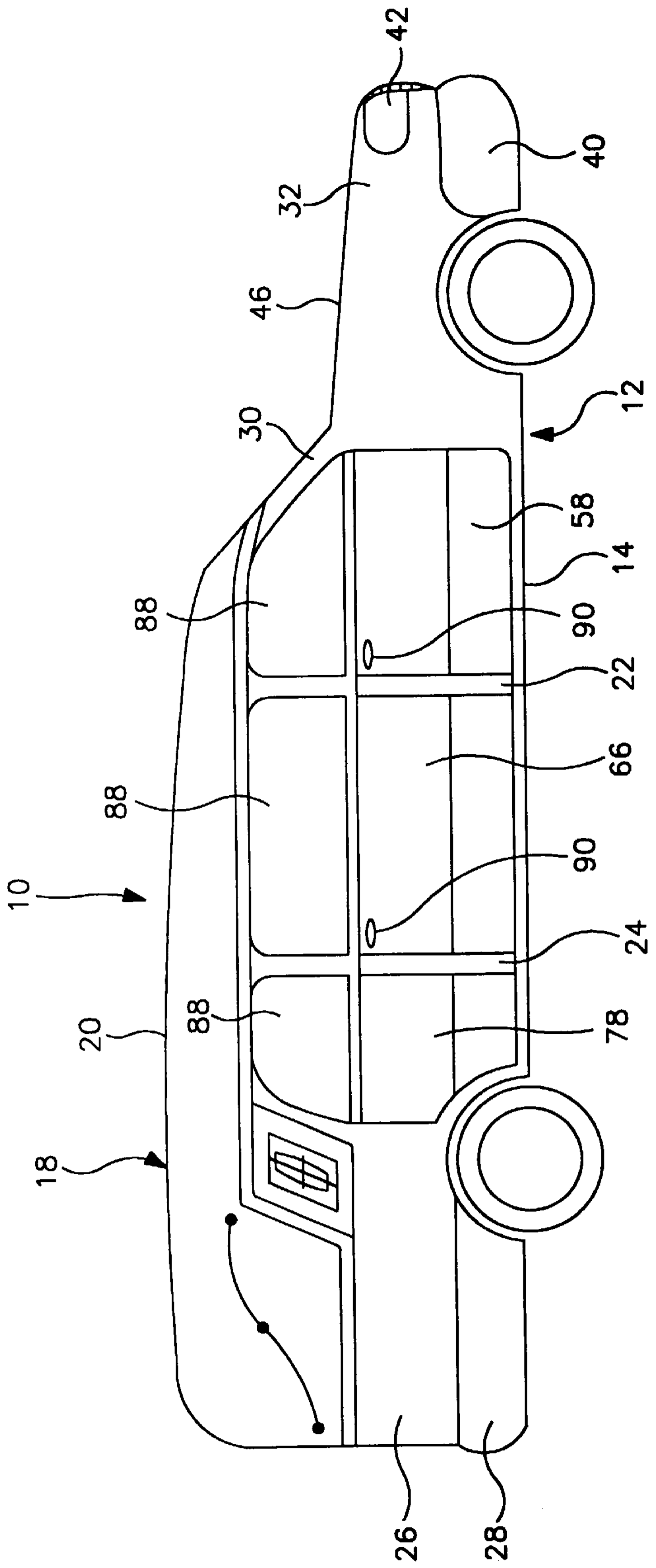
FIG. 2 is a side view illustrating a funeral coach in accordance with the principles of the invention.
Figure 3:
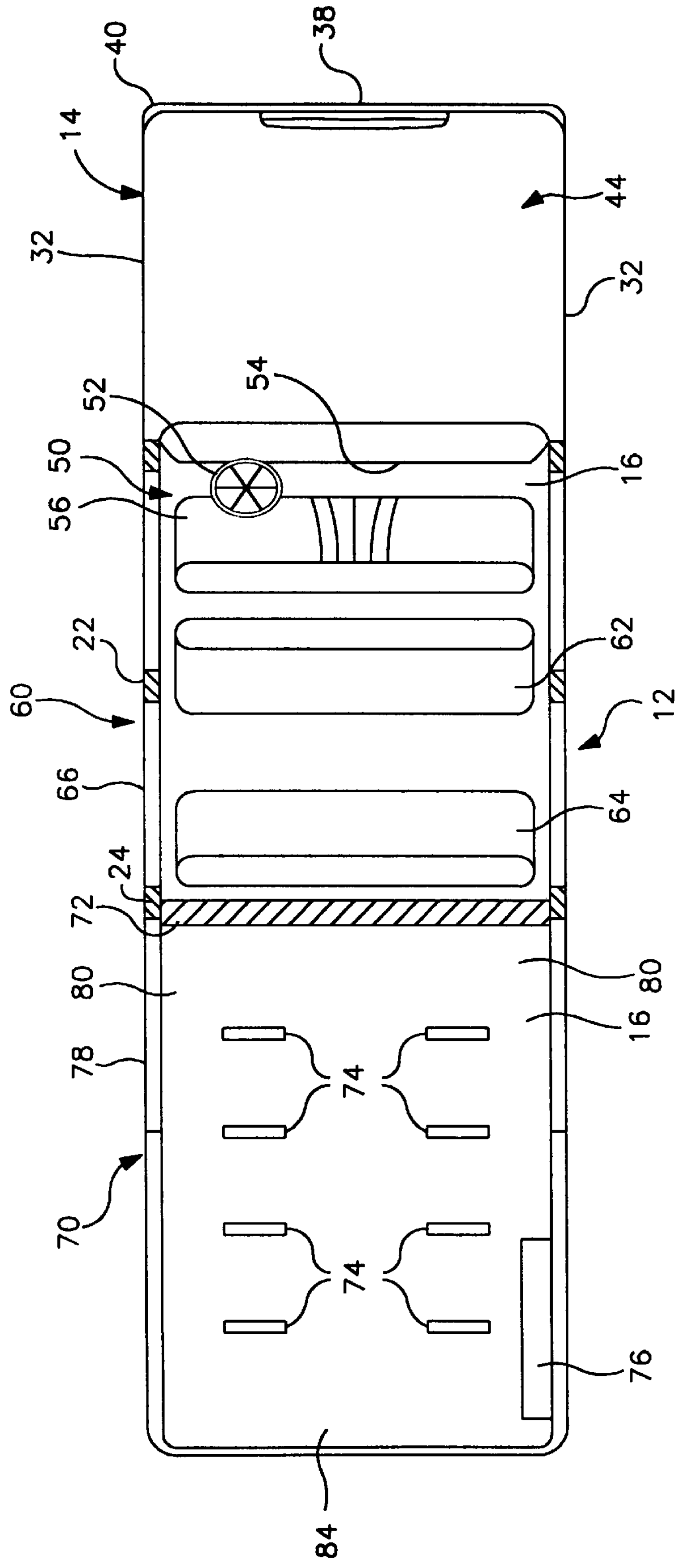
FIG. 3 is a fragmented plain view illustrating a funeral coach in accordance with the principles of the invention with the roof removed.
Figure 4:
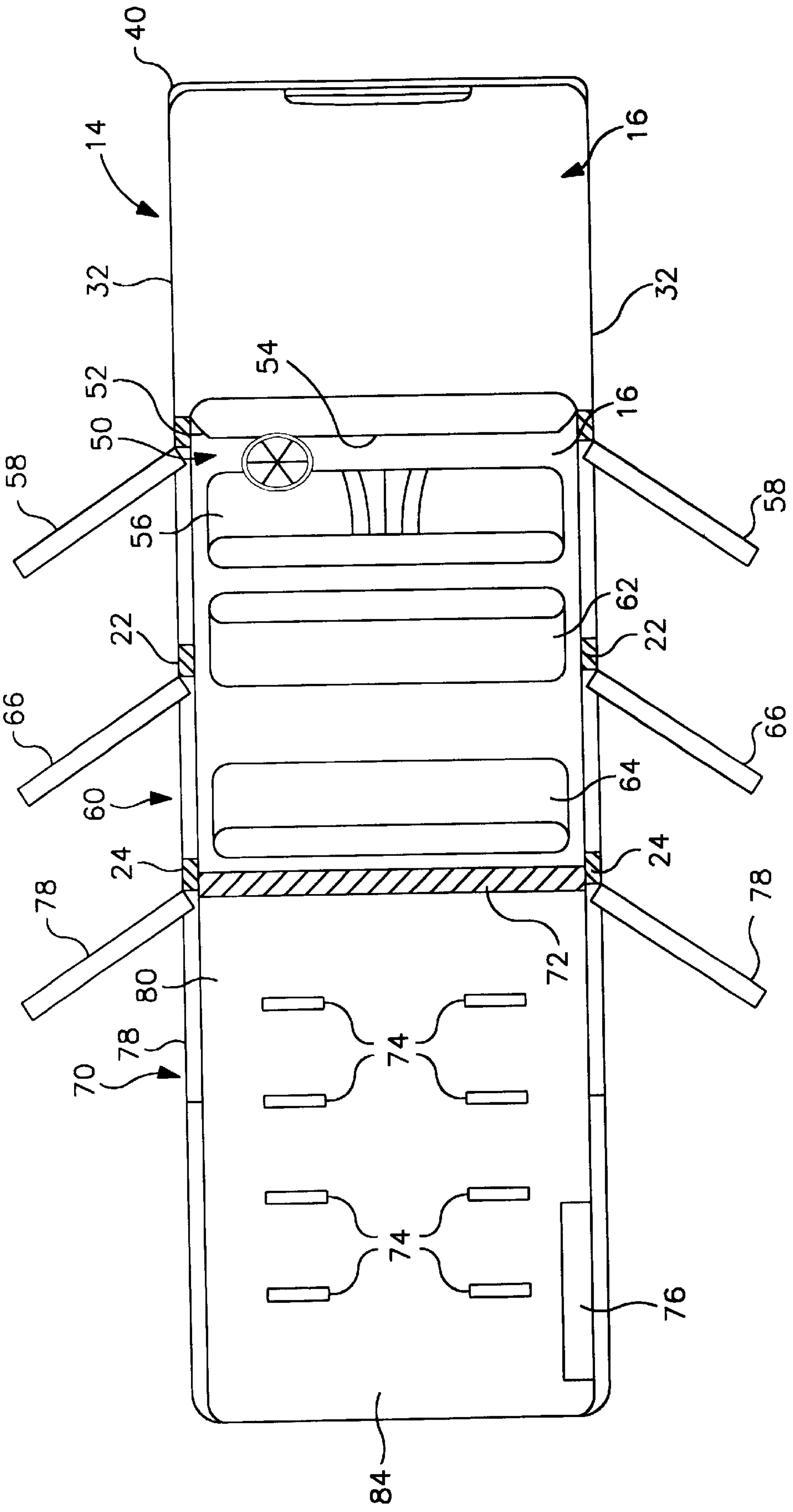
FIG. 4 is another fragmented view illustrating a funeral coach in accordance with the principles of this invention with the roof removed and doors opened.

The funeral coach 10 is provided with a driver's compartment, generally designated, by the numeral, 50 (FIG. 3). The driver's compartment 50 is provided with a steering wheel assembly 52 as well as a dashboard assembly 54 both of which are standard equipment in a funeral coach. The driver's compartment 50 is also provided with a seat 56, such as, for example a bench type seat, which can accommodate at least three persons, that is, a driver as well as two other passengers if desired. A door 58 is mounted between the front side panel 32 and intermediate panel 22 on each side of the chassis 14 of the coach 10. The doors 58 are provided to allow access by the driver and any passengers to the driver's compartment 50 from either side of the compartment.

The funeral coach 10 is also provided with a passenger compartment, generally designated, by the numeral 60 (FIG. 3). The passenger compartment 60 is located on the chassis 14 directly behind the driver's compartment 50. The passenger compartment 60 is provided with a first seat 62 which is mounted on the floor 16 to face the rear of the funeral coach. The seat 62 which may also be, for example, a bench type seat is provided to seat at least three passengers comfortably. This seat is provided to accommodate at least three of the pallbearers required to carry a casket containing the remains of the deceased.

A second seat 64 is positioned in the passenger compartment 60 across from the seat 62. The seat 64 is located in the passenger compartment 60 so that passengers seated in the seat 64 will face the passengers seated in the seat 62. The seat 64 also seats at least three passengers comfortably and will accommodate the other three pallbearers who will carry the casket containing the remains of the deceased. The seat 64 may also be for example a bench type seat.

A door 66 is mounted to open and close between the intermediate panels 22 and 24 on each side of the chassis 14 adjacent to the passenger compartment 60. The doors 66 allows access by passengers to and from the passenger compartment 60 from each side of the compartment.

The coach 10 is also provided with a storage compartment, generally designated, by the numeral, 70. The storage compartment 70 is positioned on the chassis 14 behind the passenger compartment 60 and extends from the intermediate panels 24 the length of the rear side panels 26. As a result the storage compartment 70 occupies an area on the extended chassis 14 which is substantially equal to or greater than the areas occupied by both the driver and passenger compartments 50 and 60.

The storage compartment 70 is separated from the passenger compartment 60 by a partition 72. The partition 72 extends horizontally between the intermediate side panels 24 and vertically between the floor 16 and roof 18 thereby isolating the passenger compartment 60 from the storage compartment 70. The storage compartment 70 is provided to receive and store a casket (not shown) containing the remains of the deceased as well as flowers (not shown) which would accompany the deceased.

The storage compartment 70 is provided with a plurality of roller assemblies 74 mounted in the floor 16 of the coach 10 in a well known manner. The roller assemblies 74 support the casket in the storage compartment 70 so that the casket can be easily pushed into and pulled out of the storage compartment. A rectangularly shaped compartment 76 is formed in the floor 16 of the storage compartment 70. The compartment 76 is provided to store a casket supporting device such as a church truck (not shown) which is used to rollingly support the casket thereon outside of the funeral coach when the casket is not being carried by the pallbearers.

A door 78 is mounted between the intermediate side panel 24 and the rear side panel 26 on each side of the chassis 14 adjacent to a front portion 80 of the storage compartment 70. The doors 78 permit access to the front portion 80 of the storage compartment 70 from each side of the chassis 14. The front portion 80 of the storage compartment 70 will be primarily used for storing flowers (not shown) which will accompany the deceased. The rear panel 27 of the coach 10 is provided with an opening 82 (FIG. 6) for allowing access to a rear portion 84 of the storage compartment 70 of the coach 10.

A rear door 86 which is mounted on one side of the rear panel 27 is provided to cover the access opening 82 thereby permitting access to and from the storage compartment 70 from the rear of the coach 10. This allows access to the casket in the storage compartment when desired.

Each of the doors 58, 66, 78 and 86 of the funeral coach 10 is provided with a window 88. The doors 58, 66 and 86 are also provided with a handle assembly 90 which allows the doors to be opened from the inside and outside in a well known manner. The door 78 is designed so that it can only be opened from inside the funeral coach 10 in a well known manner.

When the funeral coach 10 is in use the coach will accommodate the minister as well as other funeral personnel in the driver's compartment. All of the pallbearers necessary to carry the casket containing the deceased, which is normally six persons can be accommodated in the passenger compartment 60 and the flowers and the casket containing the deceased can be accommodated in the storage compartment 70.

It should be understood that various changes and modifications can be made without departing from the spirit and scope of the invention as defined in the claims.

What is claimed:

1. A funeral coach including:

a front member;

a rear member;

an extended chassis, coupled between the front and rear member;

side members coupled to each side of the chassis;

an upper member coupled to the side members a predetermined distance above the chassis;

a motor compartment positioned on a first predetermined portion of the chassis;

a driver's compartment positioned on a second predetermined portion of the chassis adjacent the motor compartment;

a first means traversely mounted in the drivers compartment for seating a driver and a first plurality of passengers;

a passenger compartment positioned on a third predetermined portion of the chassis adjacent to the driver's compartment;

a second means traversely mounted in the passenger compartment for seating a second plurality of passengers;

a third means traversely mounted in the passenger compartment for seating a third plurality of passengers, the third means being aligned with and spaced from the second means so that the second plurality of passengers will face the first plurality of passengers when seated on the second and third means;

a storage compartment positioned on a fourth predetermined portion of the chassis adjacent to the passenger compartment, the storage compartment occupying a space on the chassis substantially equal to the space occupied by both the driver's and passenger compartments;

means for separating the passenger compartment from the storage compartment;

a first access means for providing access to the driver's compartment from each side of the chassis;

a second access means for providing access to the passenger compartment from each side of the chassis;

a third access means for providing access to the storage compartment from each side of the chassis; and a fourth access means for providing access to the storage compartment from the rear of the chassis.

2. A funeral coach as defined in claim 1 wherein the side member include:

a first side panel mounted on each side of the chassis which extends from the front member to the beginning of the driver's compartment;

a second side panel mounted on each side of the chassis a predetermined distance from the first side panel so that a first access opening is formed therebetween;

a third side panel mounted on each side of the chassis a predetermined distance from the second side panel so that a second access opening is formed therebetween; and a fourth side panel mounted on each side of the chassis a predetermined distance from the third side panel and extending to the rear member so that a third access opening is formed between the third and fourth side panels.

3. A funeral coach as defined in claim 2 wherein the first access means includes a first door pivotably mounted on each side of the chassis to selectively cover the first access opening.

4. A funeral coach as defined in claim 3 wherein the second access means includes a second door mounted pivotably mounted on each side of the chassis to selectively cover the second access opening.

5. A funeral coach as defined in claim 4 wherein the third access means includes a third door pivotably mounted on each side of the chassis to selectively cover the third access opening.

6. A funeral coach as defined in claim 5 wherein the rear member has a rear access opening formed therein.

7. A funeral coach as defined in claim 6 wherein the fourth access means includes a rear door pivotably mounted to selectively cover the rear access opening.

8. A funeral coach as defined in claim 7 wherein the extended chassis includes a floor having portions thereof formed in the driver's compartment, passenger compartment and the storage compartment.

9. A funeral coach as defined in claim 8 wherein the storage compartment includes a plurality of spaced aligned roller members mounted in the floor thereof.

10. A funeral coach as defined in claim 9 wherein the storage compartment includes a rectangularly shaped storage compartment formed therein.

11. A funeral coach as defined in claim 10 wherein the means for separating the passenger and storage compartments includes a partition which extends horizontally between the third side panels and vertically between the floor and the upper member.

* * * * *